United States Patent
Jumonji

(10) Patent No.: US 12,406,347 B2
(45) Date of Patent: Sep. 2, 2025

(54) DETERMINING DETERIORATION OF ROAD BY INPUTTING IMAGE OF THE ROAD INTO A MODEL THAT HAS BEEN UPDATED

(71) Applicant: NEC Corporation, Tokyo (JP)

(72) Inventor: Nana Jumonji, Tokyo (JP)

(73) Assignee: NEC CORPORATION, Tokyo (JP)

( * ) Notice: Subject to any disclaimer, the term of this patent is extended or adjusted under 35 U.S.C. 154(b) by 391 days.

(21) Appl. No.: 17/910,314

(22) PCT Filed: Mar. 12, 2021

(86) PCT No.: PCT/JP2021/010096
§ 371 (c)(1),
(2) Date: Sep. 8, 2022

(87) PCT Pub. No.: WO2021/200037
PCT Pub. Date: Oct. 7, 2021

(65) Prior Publication Data
US 2023/0127338 A1 Apr. 27, 2023

(30) Foreign Application Priority Data
Mar. 31, 2020 (JP) .................. 2020-062853

(51) Int. Cl.
G06T 7/00 (2017.01)
B60W 40/06 (2012.01)

(52) U.S. Cl.
CPC .......... *G06T 7/0002* (2013.01); *B60W 40/06* (2013.01); *B60W 2556/45* (2020.02); *G06T 2207/30248* (2013.01)

(58) Field of Classification Search
None
See application file for complete search history.

(56) References Cited

U.S. PATENT DOCUMENTS

| | | | |
|---|---|---|---|
| 11,584,377 B2* | 2/2023 | Cox | B60W 30/0956 |
| 2018/0137336 A1 | 5/2018 | Shoda et al. | |
| 2018/0195973 A1 | 7/2018 | Yonekawa et al. | |
| 2019/0276007 A1* | 9/2019 | Stein | G06T 7/60 |
| 2020/0139976 A1* | 5/2020 | Magnusson | G01C 21/3822 |

(Continued)

FOREIGN PATENT DOCUMENTS

| | | |
|---|---|---|
| JP | 2010-218569 A | 9/2010 |
| JP | 2016-057861 A | 4/2016 |

(Continued)

OTHER PUBLICATIONS

International Search Report for PCT Application No. PCT/JP2021/010096, mailed on Apr. 13, 2021.

(Continued)

*Primary Examiner* — Tahmina N Ansari

(57) ABSTRACT

A road deterioration determination device includes a selection unit and a determination unit. The selection unit selects an image of a road surface captured at one point on a road on the basis of priorities of values of attributes set for each of points on the road and related to image capture for images of the road surface captured at the points. The determination unit determines road deterioration at the one point using the selected image and a model for determining road deterioration from the image.

10 Claims, 16 Drawing Sheets

(56) References Cited

U.S. PATENT DOCUMENTS

| | | | | |
|---|---|---|---|---|
| 2020/0209864 A1* | 7/2020 | Chen | ............... | G01C 21/3811 |
| 2021/0221380 A1* | 7/2021 | Magnusson | ........ | G01C 21/3841 |
| 2023/0152467 A1* | 5/2023 | Cox | ................ | G06V 10/774 |
| | | | | 701/23 |

FOREIGN PATENT DOCUMENTS

| | | |
|---|---|---|
| JP | 2018-081404 A | 5/2018 |
| JP | 2018-087484 A | 6/2018 |
| JP | 2019-022205 A | 2/2019 |

OTHER PUBLICATIONS

English translation of Written opinion for PCT Application No. PCT/JP2021/010096, mailed on Apr. 13, 2021.

\* cited by examiner

Fig.3

INFORMATION ID

| VEHICLE ID | IMAGING DATE | IMAGING TIME | IMAGING POINT | IMAGE FILE | VEHICLE TYPE | WEATHER | TIME ZONE |
|---|---|---|---|---|---|---|---|
| 1 | 2020/3/10 | 13:00:00 | A1_1 | IMAGE 1 | VAN | CLOUDY | 12:00 ~ 14:00 |
| 1 | 2020/3/10 | 13:00:10 | A1_2 | IMAGE 2 | VAN | CLOUDY | 12:00 ~ 14:00 |
| 1 | 2020/3/11 | 15:35:20 | A1_1 | IMAGE 3 | VAN | SUNNY | 14:00 ~ 16:00 |
| 1 | 2020/3/11 | 15:35:10 | A1_2 | IMAGE 4 | VAN | SUNNY | 14:00 ~ 16:00 |
| 2 | 2020/3/12 | 8:45:30 | A1_1 | IMAGE 5 | SUV | SUNNY | 8:00 ~ 10:00 |
| 2 | 2020/3/12 | 8:45:40 | A1_2 | IMAGE 6 | SUV | SUNNY | 8:00 ~ 10:00 |
| 2 | 2020/3/13 | 13:00:30 | A1_1 | IMAGE 7 | SUV | RAINY | 12:00 ~ 14:00 |
| 2 | 2020/3/13 | 13:00:35 | A1_2 | IMAGE 8 | SUV | RAINY | 12:00 ~ 14:00 |
| ... | ... | ... | ... | ... | ... | ... | ... |

Fig.5

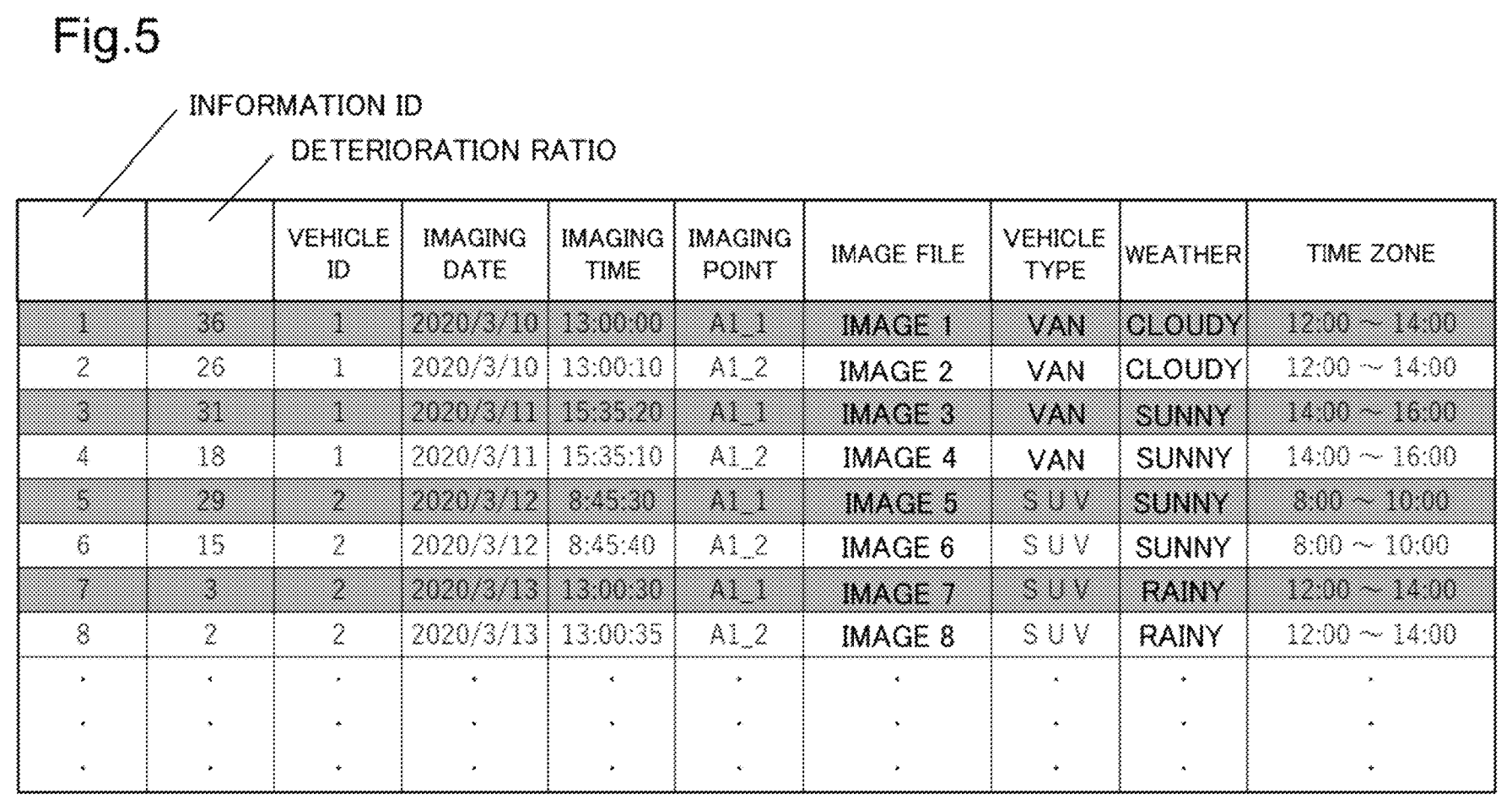

INFORMATION ID
DETERIORATION RATIO

| | VEHICLE ID | IMAGING DATE | IMAGING TIME | IMAGING POINT | IMAGE FILE | VEHICLE TYPE | WEATHER | TIME ZONE |
|---|---|---|---|---|---|---|---|---|
| 1 | 1 | 2020/3/10 | 13:00:00 | A1_1 | IMAGE 1 | VAN | CLOUDY | 12:00 ~ 14:00 |
| 2 | 1 | 2020/3/10 | 13:00:10 | A1_2 | IMAGE 2 | VAN | CLOUDY | 12:00 ~ 14:00 |
| 3 | 1 | 2020/3/11 | 15:35:20 | A1_1 | IMAGE 3 | VAN | SUNNY | 14:00 ~ 16:00 |
| 4 | 1 | 2020/3/11 | 15:35:10 | A1_2 | IMAGE 4 | VAN | SUNNY | 14:00 ~ 16:00 |
| 5 | 2 | 2020/3/12 | 8:45:30 | A1_1 | IMAGE 5 | SUV | SUNNY | 8:00 ~ 10:00 |
| 6 | 2 | 2020/3/12 | 8:45:40 | A1_2 | IMAGE 6 | SUV | SUNNY | 8:00 ~ 10:00 |
| 7 | 2 | 2020/3/13 | 13:00:30 | A1_1 | IMAGE 7 | SUV | RAINY | 12:00 ~ 14:00 |
| 8 | 2 | 2020/3/13 | 13:00:35 | A1_2 | IMAGE 8 | SUV | RAINY | 12:00 ~ 14:00 |
| ... | ... | ... | ... | ... | ... | ... | ... | ... |

Fig.6

| POINT | DETERIORATION RATIO |
|---|---|
| A1_1 | 40 |
| A1_2 | 30 |
| . | . |
| . | . |
| . | . |

Fig.7

POINT A1_1

| PRIORITY | ATTRIBUTE | ATTRIBUTE VALUE |
|---|---|---|
| 1 | WEATHER | CLOUDY |
| 2 | TIME ZONE | 12:00 ~ 14:00 |
| 3 | VEHICLE TYPE | VAN |

Fig.11

POINT A1_1

| PRIORITY | ATTRIBUTE | | |
|---|---|---|---|
| | VEHICLE TYPE | WEATHER | TIME ZONE |
| 1 | VAN | CLOUDY | 12:00 ~ 14:00 |
| 2 | S U V | SUNNY | 14:00 ~ 16:00 |
| 3 | SEDAN | RAINY | 10:00 ~ 12:00 |

Fig.12

POINT A1_1

| PRIORITY | SCORE | ATTRIBUTE | | |
|---|---|---|---|---|
| | | VEHICLE TYPE | WEATHER | TIME ZONE |
| 1 | 30 | VAN | CLOUDY | 12:00 ~ 14:00 |
| 2 | 20 | SUV | SUNNY | 14:00 ~ 16:00 |
| 3 | 0 | SEDAN | RAINY | 10:00 ~ 12:00 |

Fig.15

POINT A1_1

| IMAGE INFORMATION | VEHICLE TYPE | WEATHER | TIME ZONE | TOTAL SCORE |
|---|---|---|---|---|
| 1 | VAN | CLOUDY | 14:00 ~ 16:00 | 80 |
| 2 | SUV | SUNNY | 10:00 ~ 12:00 | 40 |
| 3 | SEDAN | RAINY | 12:00 ~ 14:00 | 30 |

DETERMINING DETERIORATION OF ROAD BY INPUTTING IMAGE OF THE ROAD INTO A MODEL THAT HAS BEEN UPDATED

This application is a National Stage Entry of PCT/JP2021/010096 filed on Mar. 12, 2021, which claims priority from Japanese Patent Application 2020-062853 filed on Mar. 31, 2020, the contents of all of which are incorporated herein by reference, in their entirety.

TECHNICAL FIELD

The present disclosure relates to a road deterioration determination device, a road deterioration determination method, and a storage medium.

BACKGROUND ART

In road deterioration determination, devices that automatically detect deteriorations of roads by analyzing road images captured from vehicles with computers have been introduced.

An example of such a device is disclosed in PTL 1. In order to improve accuracy of analysis, PTL 1 discloses a technology for selecting an image that may hinder normal analysis, for example, an image in which a shadow of a tree or a building is reflected on a road surface, an image excluding an image of a wet road surface, or the like, and using the image for analysis.

CITATION LIST

Patent Literature

[PTL 1] JP 2016-57861 A

SUMMARY OF INVENTION

Technical Problem

In order to improve accuracy of analysis of a road image, it is conceivable to set values of various attributes related to image capturing as image selection conditions used for the analysis. However, such selection conditions may vary depending on points (environments) on roads. For example, when a condition related to a time zone in which an image is captured is set, there is a possibility of analysis accuracy with an image captured in a time zone A being higher than analysis accuracy with an image captured in a time zone B at a certain point, but analysis accuracy with an image captured in the time zone A being lower than analysis accuracy with an image captured in the time zone B at another point due to a difference in brightness of the road depending on a time zone.

The technology disclosed in PTL 1 does not disclose use of different selection conditions in accordance with points (environments).

An objective of the present disclosure is to provide a road deterioration determination device, a road deterioration determination method, and a storage medium capable of solving the above-described problems and improving determination accuracy at various points in road deterioration determination.

Solution to Problem

According to an aspect of the present disclosure, a road deterioration determination device includes: a selection means configured to select an image of a road surface captured at one point on a road based on priority of a value of an attribute related to capturing of the image of the road surface captured at the point, the value of the attribute being set for each point on the road; and a determination means configured to determine deterioration of the road at the one point by using the selected image and a model for determining the deterioration of the road from the image.

According to another aspect of the present disclosure, a road deterioration determination method includes: selecting an image of a road surface captured at one point on a road based on priority of a value of an attribute related to capturing of the image of the road surface captured at the point, the value of the attribute being set for each point on the road; and determining deterioration of the road at the one point by using the selected image and a model for determining the deterioration of the road from the image.

According to still another aspect of the present disclosure, a computer-readable storage medium storing a program causing a computer to: select an image of a road surface captured at one point on a road based on priority of a value of an attribute related to capturing of the image of the road surface captured at the point, the value of the attribute being set for each point on the road; and determine deterioration of the road at the one point by using the selected image and a model for determining the deterioration of the road from the image.

Advantageous Effects of Invention

According to the present disclosure, there is the advantageous effect of improving determination accuracy in various points in road deterioration determination.

BRIEF DESCRIPTION OF DRAWINGS

FIG. 3 is a diagram illustrating an example of image information to which an attribute is added according to the first example embodiment.

FIG. 5 is a diagram illustrating an example of a deterioration ratio calculated from a determination result with a road deterioration determination model according to the first example embodiment.

FIG. 6 is a diagram illustrating an example of a deterioration ratio calculated from a road deterioration state (answer data) according to the first example embodiment.

FIG. 7 is a diagram illustrating an example of priority of attribute values according to the first example embodiment.

FIG. 11 is a diagram illustrating an example of priority of an attribute value for each attribute according to the second example embodiment.

FIG. 12 is a diagram illustrating an example of a score table according to the second example embodiment.

FIG. 15 is a diagram illustrating an example of a total score calculated for image information according to the second example embodiment.

EXAMPLE EMBODIMENT

Figure 1:
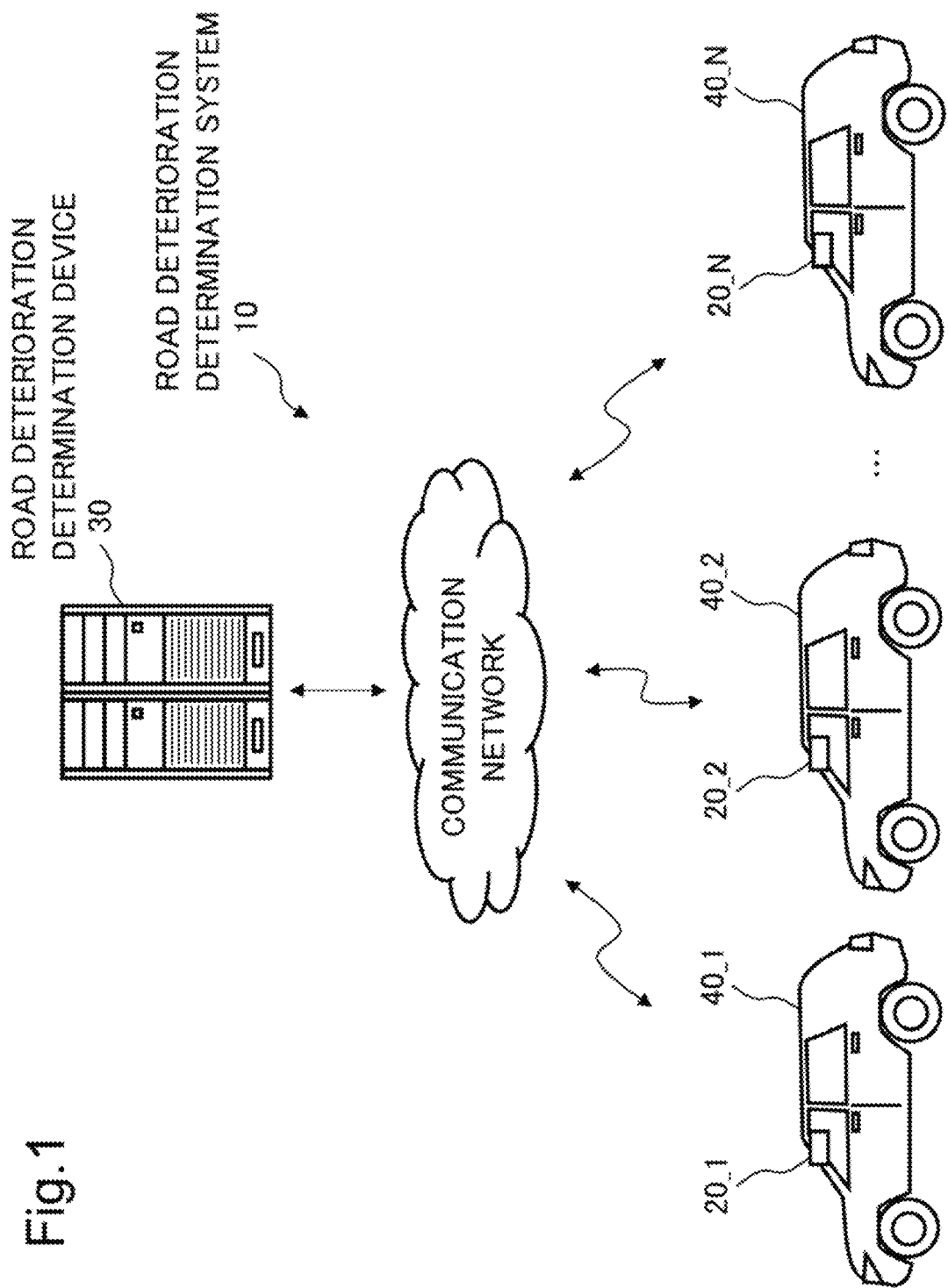
FIG. 1 is a schematic diagram illustrating an overview of a road deterioration determination system 10 according to a first example embodiment.

Example embodiments will be described in detail with reference to the drawings. In the drawings and the example embodiments described in the present specification, the same reference numerals are given to the same components, and the description thereof will be omitted as appropriate.

First Example Embodiment

A first example embodiment will be described.

First, a configuration of a road deterioration determination system according to the first example embodiment will be described. FIG. 1 is a diagram illustrating an overview of a road deterioration determination system 10 according to the first example embodiment. Referring to FIG. 1, the road deterioration determination system 10 includes a plurality of imaging devices 20_1, 20_2, . . . , 20_N (where N represents a natural number) (hereinafter, collectively referred to as the imaging device 20), a road deterioration determination device 30, and a plurality of vehicles 40_1, 40_2, . . . , 40_N (where N represents a natural number) (hereinafter, collectively referred to as a vehicle 40).

In the road deterioration determination system 10, the imaging devices 20_1, 20_2, . . . , 20_N are mounted on the vehicles 40_1, 40_2, . . . , 40_N belonging to an institution that manages roads, such as a local government, municipality or a road management company, for example. In the road deterioration determination system 10, the road deterioration determination device 30 and the imaging devices 20_1, 20_2, . . . , 20_N are connected to be able to communicate via a communication network, for example.

The road deterioration determination device 30, for example, is deposed in a road management department of the above-described institution. The road deterioration determination device 30 may be disposed in a place other than the road management department of the above-described institution. In this case, the road deterioration determination device 30 may be implemented by a cloud computing system. In the present example embodiment, a case where the imaging device 20 is mounted on the vehicle 40 will be described. In this case, the imaging device 20 may be, for example, a drive recorder mounted on a vehicle. The imaging device 20 may be mounted on another moving body such as a bicycle or a drone, or a person may carry the imaging device 20.

Figure 2:
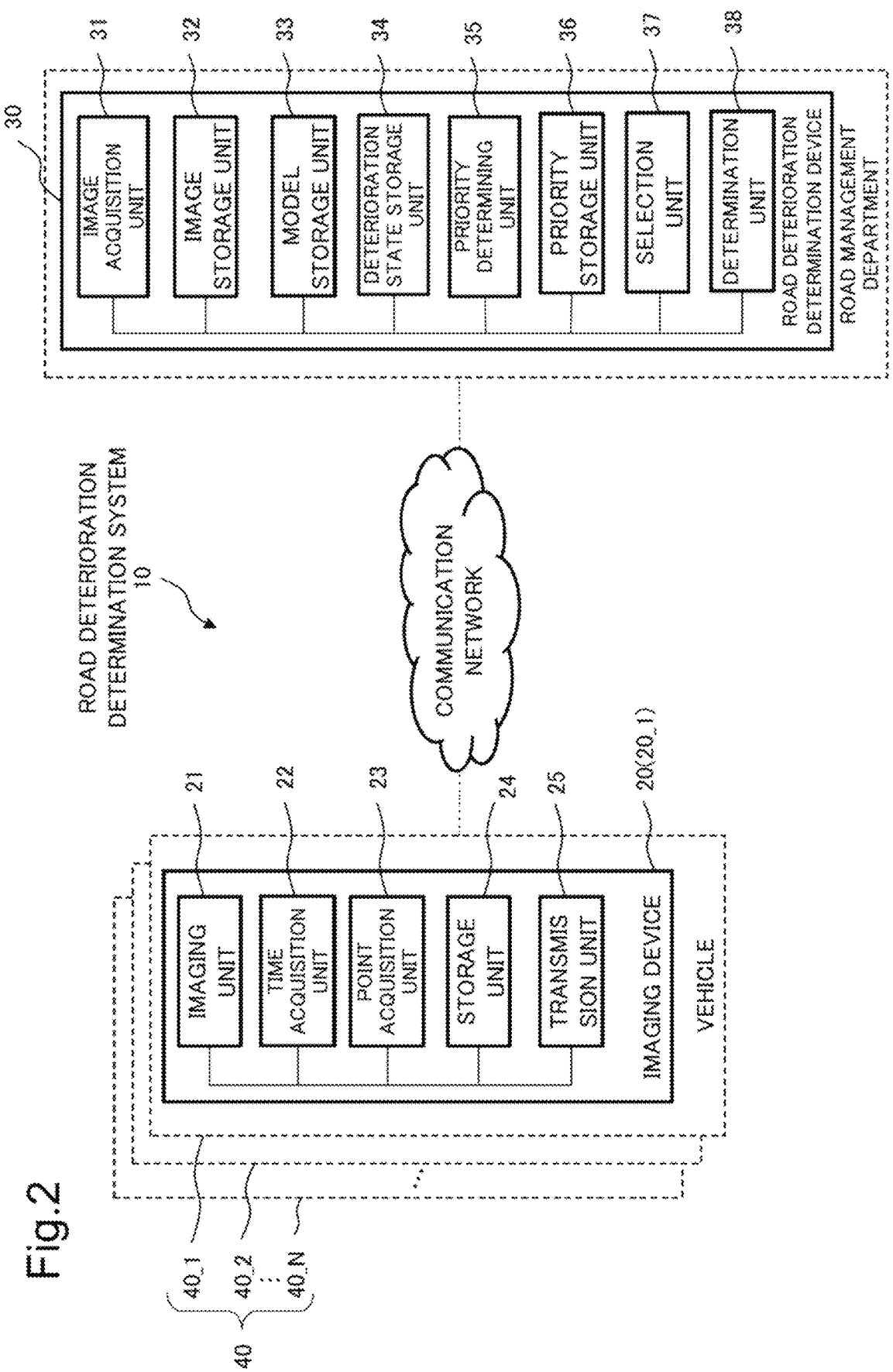
FIG. 2 is a block diagram illustrating a configuration of the road deterioration determination system 10 according to the first example embodiment.

Next, a configuration of each device will be described with reference to FIG. 2. FIG. 2 is a block diagram illustrating a configuration of the road deterioration determination system 10 according to the first example embodiment.

In the present disclosure, deterioration of a road which is a target is determined, but the present disclosure can also be applied to a structure other than a road. For example, the structure may be a structure in a social infrastructure such as a road (for example, a road surface, a sign, and a ceiling and a side wall of a tunnel or the like), a railway, a harbor, a dam, or a communication facility. Alternatively, the structure may be a structure in a life-related social capital such as a school, a hospital, a park, or a social welfare facility.

(Configuration of Imaging Device)

As illustrated in FIG. 2, the imaging device 20 includes an imaging unit 21, a time acquisition unit 22, a point acquisition unit 23, a storage unit 24, and a transmission unit 25.

The imaging unit 21 captures an image of a road on which the vehicle 40 travels. The imaging unit 21 captures images around the vehicle 40 at predetermined intervals while the vehicle 40 is traveling on a road. The images obtained through the imaging include roads in front of the vehicle 40 and the surroundings. When the imaging device 20 is mounted on a whole moving object, the images obtained through the imaging are images of roads on which the moving object is moving and the surroundings of the moving object. In the case of peoples, the images are images of roads on which peoples are moving and the surroundings of the people The time acquisition unit 22 acquires a date and time (hereinafter also referred to as an imaging date and an imaging time) at which the imaging unit 21 has captured an image. The time acquisition unit 22 outputs the imaging date and the imaging time to the imaging unit 21.

The point acquisition unit 23 acquires points on the road (hereinafter also referred to as imaging points) captured by the imaging unit 21. The point acquisition unit 23 is, for example, a Global Positioning System (GPS) receiver, and may be included in the imaging unit 21 or may be a separate unit. The point acquisition unit 23 outputs the imaging points to the imaging unit 21.

The imaging unit 21 acquires the imaging date and the imaging time from the time acquisition unit 22, acquires the imaging point from the point acquisition unit 23, and stores the imaging date, the imaging time, and the imaging point as image information in the storage unit 24 in association with the captured image.

The storage unit 24 stores a vehicle identifier (ID). The storage unit 24 stores image information. The storage unit 24 may be, for example, a portable storage medium such as a random access memory (RAM) or a Universal Serial Bus (USB) memory.

When the storage unit 24 is a portable storage medium such as a USB memory, an image of the USB memory may be directly read by the road deterioration determination device 30. In this case, for example, the driver of the vehicle 40 may pass the USB memory storing the image to an operator of the road deterioration determination device 30, and the operator may cause the road deterioration determination device 30 to read the USB memory.

The transmission unit 25 acquires image information from the storage unit 24 and transmits the image information to the road deterioration determination device 30 via the communication network. The transmission of the image information may be, for example, a form in which image information including an image is transmitted whenever the image is captured or a form in which image information including each of one or more images captured for each period is transmitted every predetermined period.

(Configuration of Road Deterioration Determination Device)

As illustrated in FIG. 2, the road deterioration determination device 30 includes an image acquisition unit 31, an image storage unit 32, a model storage unit 33, a deterioration state storage unit 34, a priority determining unit 35, a priority storage unit 36, a selection unit 37, and a determination unit 38.

Some or all of the components of the road deterioration determination device 30 may be implemented by a cloud computing system as described above.

The road deterioration determination device 30 determines deterioration of a road surface of a road. Here, examples of the deterioration of the road surface include unevenness, a rut, cracking, and a pothole of the road surface.

The image acquisition unit 31 receives the image information transmitted from the imaging device 20 via the communication network. The image acquisition unit 31 adds a value of at least one attribute (hereinafter also referred to as an attribute value) to the acquired image information and stores the image information in the image storage unit 32.

FIG. 3 is a diagram illustrating an example of image information to which an attribute is added according to the first example embodiment. In the example of FIG. 3, in the image information, an information ID is added to a vehicle ID, an imaging date, an imaging time, an imaging point, and an image file included in the image information transmitted from the imaging device 20. The information ID is an identifier for identifying the image information. Further, a vehicle type, weather, and a time zone are added as attributes.

Here, for example, a name or an identifier indicating a format of the vehicle 40 is set in the vehicle type. In addition, the type of the vehicle 40 such as a sedan, a van, or a wagon may be set as the vehicle type. As the weather, for example, a weather type (sunny, cloudy, rainy, or the like) of an imaging point at the imaging time included in the image information acquired from a meteorological agency, a weather site on the Internet, or the like is set. As the time zone, for example, a predetermined time zone determined with the imaging date and the imaging time included in the image information is set.

An attribute added to the image information may further include an in-vehicle environment (a windshield reflection state, a dirty windshield state) and road conditions. For example, a level of reflection of the vehicle interior on the windshield is set as the windshield reflection state. For example, a dirty level of the windshield is set as the dirty windshield state. In the road conditions, presence or absence of a shadow, presence or absence of a snow cover, a dry level, a type of pavement, and the like in the road area are set. The vehicle interior environment and the road conditions are acquired, for example, by application to a known image analysis technology such as pattern matching or an artificial intelligence (AI) model learned by machine learning or deep learning to an image included in image information.

The image acquisition unit 31 may read (acquire) image information from a storage medium such as a USB memory.

The image storage unit 32 stores the image information to which the attribute is added by the image acquisition unit 31.

The model storage unit 33 stores a road deterioration determination model input in advance by an operator or the like. The road deterioration determination model is a model for determining (estimating) presence or absence of deterioration of a road from an image of a road area (a road surface) and is obtained by, for example, learning an image of the deterioration of the road by machine learning or deep learning. When the image of the road area (the road surface) is input, the road deterioration determination model outputs a determination result of the deterioration of the road.

Figure 4:
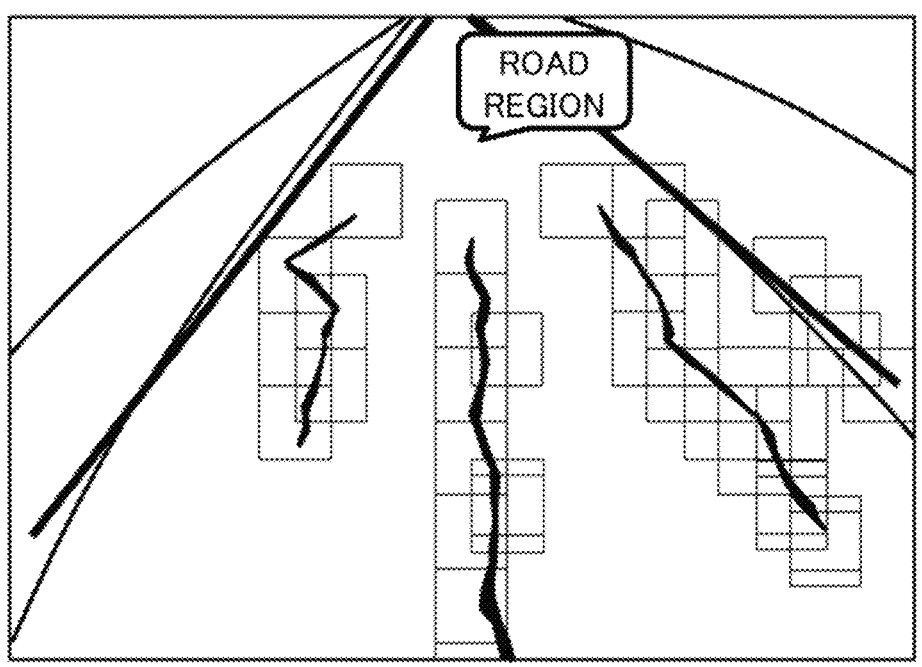
FIG. 4 is a diagram illustrating an example of a determination result of road deterioration according to the first example embodiment.

FIG. 4 is a diagram illustrating an example of a determination result of the deterioration of the road according to the first example embodiment. In FIG. 4, in the road area, a plurality of rectangles are shown along the determined deterioration of the road (cracking). Here, the rectangle indicates a partial region determined to have deterioration of the road (cracking) when the road area is divided into a plurality of partial regions and whether there is the deterioration of the road (cracking) is determined for each partial region.

The road deterioration determination model outputs, as a determination result of the deterioration of the road, for example, an image in which a partial region determined to have the deterioration of the road is shown in a road area, as illustrated in FIG. 4.

The deterioration state storage unit 34 stores the road deterioration state at each point on the road input in advance by the operator or the like along with an acquisition time of the deterioration state. The road deterioration state is an actual state of the deterioration of the road. The road deterioration state is used as "answer data" when the priority determining unit 35 determines the priority of an attribute value at each point. The road deterioration state is obtained, for example, by an inspector or the like checking an image or an actual road surface state with respect to a determination result of each partial region of the image by the road deterioration determination model, as in FIG. 4, and correcting the determination result. In this case, as the acquisition time, an imaging time of an image used for determination by the road deterioration determination model is used.

As long as the actual deterioration state of the road is represented, for example, the road deterioration state may be a state obtained in accordance with another known method such as a result obtained by causing a vehicle on which a laser scanner and an acceleration sensor are mounted to travel.

The priority determining unit 35 determines the priority of the attribute value added to the image for each point on the road. The priority is used to select an image (select an image with a high priority) when the road deterioration determination using the road deterioration determination model is executed.

The priority determining unit 35 acquires, from the deterioration state storage unit 34, a road deterioration state of a target point (hereinafter also referred to as priority calculation target point) at which priority is calculated and the acquisition time of the deterioration state. The priority determining unit 35 acquires, from the image storage unit 32, image information in which an imaging time is within a target period (hereinafter also referred to as a priority calculation target period) in which the priority is calculated. Here, the priority calculation target period is a period in which it is expected that the deterioration state is not greatly changed from the road deterioration state (answer data) acquired from the deterioration state storage unit 34 and is, for example, any period within a predetermined time from the acquisition time of the deterioration state. Further, the priority determining unit 35 acquires the road deterioration determination model from the model storage unit 33.

The priority determining unit 35 inputs each of the images included in the image information within the priority calculation target period to the road deterioration determination model and acquires a determination result of the deterioration of the road. Then, the priority determining unit 35 compares each of the acquired determination results with the road deterioration state (the answer data) acquired from the deterioration state storage unit 34. Here, the priority determining unit 35 calculates a deterioration ratio in the road area of the image to each of the determination result by the road deterioration determination model and the road deterioration state (the answer data) and executes comparing. The deterioration ratio in the road area is, for example, a ratio of an area of a partial region in which deterioration of the road is determined to an area of the entire road area on the image.

FIG. 5 is a diagram illustrating an example of a deterioration ratio calculated from a determination result by the road deterioration determination model according to the first example embodiment. In the example of FIG. 5, the deterioration ratio is illustrated in addition to the image information at each point. FIG. 6 is a diagram illustrating an example of a deterioration ratio calculated from a road deterioration state (answer data) according to the first example embodiment. In the example of FIG. 6, the deterioration ratio at each point is illustrated.

The priority determining unit 35 may compare the presence or absence of the deterioration of the road and the number of deteriorations in the road in addition to the above-described deterioration ratio.

The priority determining unit 35 determines the priority of the attribute value based on the result of the above-described comparison. For example, the priority determining unit 35 calculates a matching ratio between a determination result by the road deterioration determination model and the road deterioration state (answer data) for each image. Then, based on the matching ratio calculated for each image and the attribute value of each image, the priority determining unit 35 determines the priority in such a way that the priority of the attribute value is higher as the matching ratio is higher. Here, for example, the priority determining unit 35 calculates an average value of the matching ratio for each possible attribute value of each attribute. Then, the priority determining unit 35 determines the priority of the attribute value in such a way that the priority is higher as the average value of the matching ratios is higher. The priority determining unit 35 may obtain an attribute that has a correlation with the matching ratio (an attribute that has the degree of correlation equal to or more than a predetermined value) in accordance with, for example, a statistical scheme such as multivariate analysis and may calculate an average value of the matching ratios of the attribute values for the attribute that has the correlation.

FIG. 7 is a diagram illustrating an example of priority of attribute values according to the first example embodiment. In the example of FIG. 7, attribute values are illustrated in a descending order of the priority (an ascending order of the priority values).

The priority determining unit 35 stores the priority of the attribute value at each of the determined points in the priority storage unit 36.

The priority storage unit 36 stores the priority of the attribute value at each point determined by the priority determining unit 35.

The selection unit 37 acquires, from the priority storage unit 36, the priority of the attribute values of target points at which the deterioration of the road is determined (hereinafter also referred to as determination target points). The selection unit 37 selects, from the image information stored in the image storage unit 32, image information in which the imaging point is the determination target point within a target period in which the imaging time is determined (hereinafter also referred to as a determination target period) and the priority of the attribute value is high (has the highest priority or a priority equal to or more than a predetermined value). The determination target period may be different from or overlap the above-described priority calculation target period.

The determination unit 38 determines deterioration of the road at the determination target point by using the road deterioration determination model. The determination unit 38 inputs an image included in the image information selected by the selection unit 37 to the road deterioration determination model and obtains a determination result of the deterioration of the road. The determination unit 38 causes a display device or the like (not illustrated) to output (display) the determination result.

Next, an operation according to the first example embodiment will be described.

(Priority Setting Process)

The priority setting process will be described.

Figure 8:
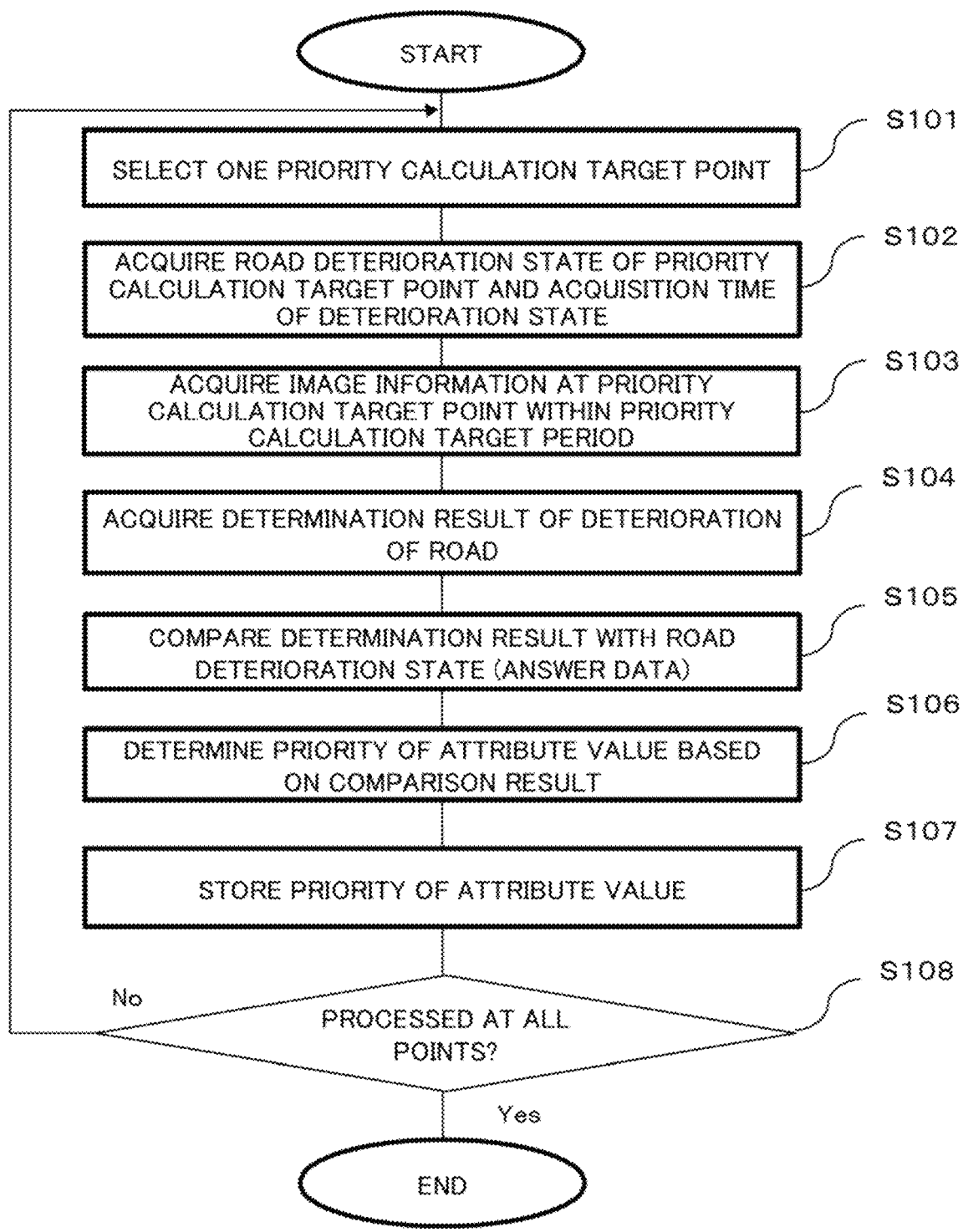
FIG. 8 is a flowchart illustrating a priority setting process according to the first example embodiment.

FIG. 8 is a flowchart illustrating a priority setting process according to the first example embodiment. The priority setting process is executed, for example, in response to an instruction from an operator or the like when a plurality of pieces of image information can be acquired at each point on the road.

Here, it is assumed that image information as illustrated in FIG. 3 is stored in the image storage unit 32. It is assumed that the road deterioration determination model is stored in advance in the model storage unit 33 and a road deterioration state at each point is stored in the deterioration state storage unit 34.

The priority determining unit 35 selects one priority calculation target point from points on the road (step S101).

The priority determining unit 35 acquires the road deterioration state of the priority calculation target point and the acquisition time of the deterioration state from the deterioration state storage unit 34 (step S102).

The priority determining unit 35 acquires the image information in which the imaging point is the priority calculation target point and the imaging time is within the priority calculation target period from the image storage unit 32 (step S103).

The priority determining unit 35 inputs each of the images included in the image information in the priority calculation target period to the road deterioration determination model and acquires a determination result of the deterioration of the road (step S104).

The priority determining unit 35 compares each of the acquired determination results with the road deterioration state (the answer data) acquired from the deterioration state storage unit 34 (step S105). For example, the priority determining unit 35 calculates the deterioration ratio, as illustrated in FIG. 5, at the point A1_1 based on each of the acquired determination results. The priority determining unit 35 calculates the deterioration ratio of the point A1_1, as illustrated in FIG. 6, based on the road deterioration state. The priority determining unit 35 calculates the matching ratio of the deterioration ratio.

The priority determining unit 35 determines the priority of the attribute value based on the comparison result (step S106). For example, the priority determining unit 35 determines the priority of the attribute value, as illustrated in FIG. 7 based on the matching ratio calculated for each image at the point A1_1 and the attribute value.

The priority determining unit 35 stores the determined priority of the attribute value in the priority storage unit 36 (step S107).

The priority determining unit 35 repeats the process from step S101 at all the points on the road (step S108).

Depending on the point, the number of pieces of image information in the priority calculation target period is small, and it is conceivable that an appropriate priority cannot be determined. Accordingly, the priority determination process is preferably executed at a timing at which a sufficient number of pieces of image information in the priority calculation target period are obtained. The priority of the attribute value is likely to change due to a change in the road environment (for example, a growth of trees, new surrounding structures, and the like). Accordingly, the priority setting process is preferably executed periodically while updating the priority calculation target period to, for example, the latest period.

(Road Deterioration Determination Process)

A road deterioration determination process in the road deterioration determination device 30 will be described.

Figure 9:
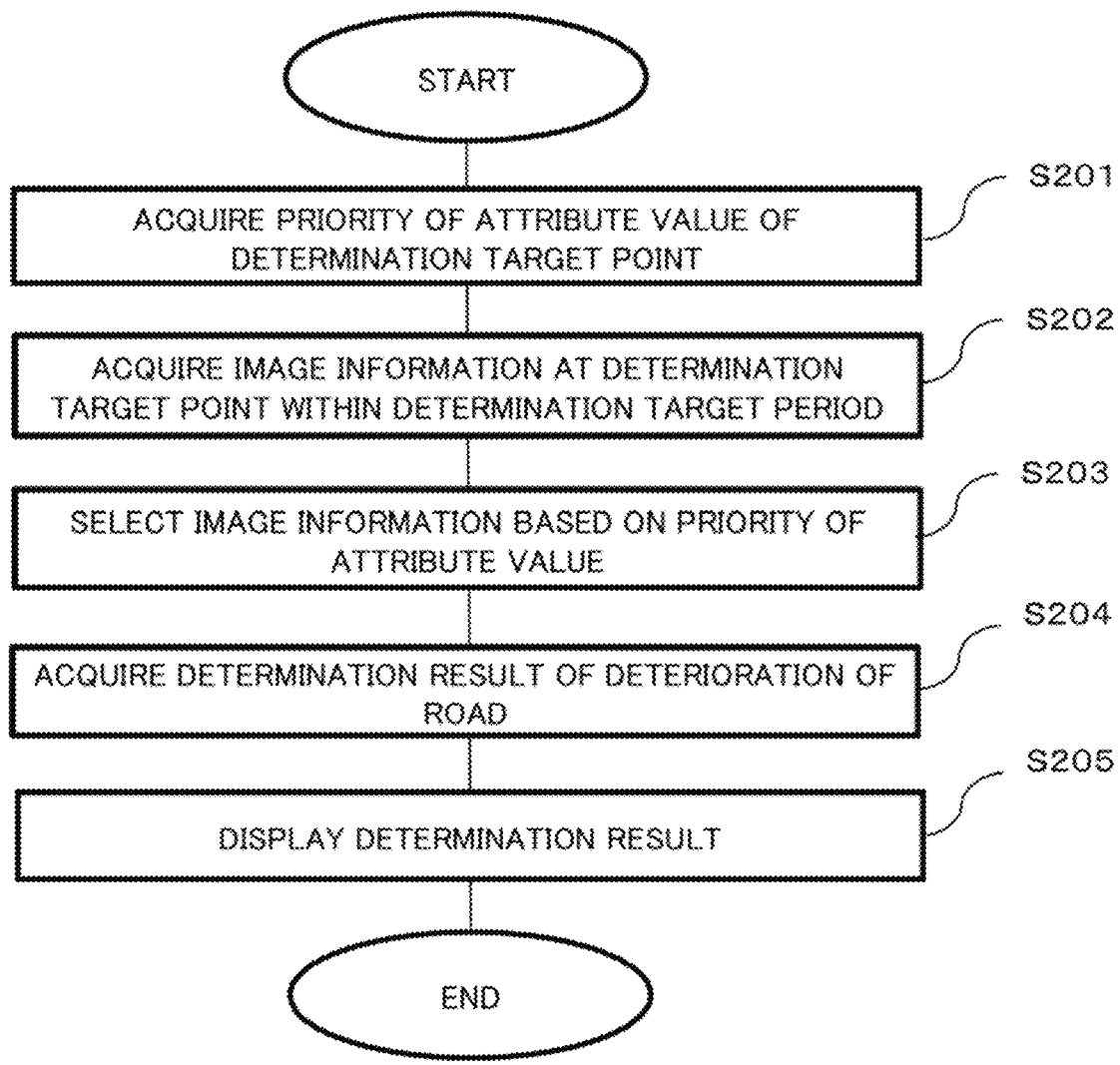
FIG. 9 is a flowchart illustrating a road deterioration determination process according to the first example embodiment.

FIG. 9 is a flowchart illustrating a road deterioration determination process according to the first example embodiment. The road deterioration determination process is executed in response an instruction from an operator or the like after the priority of the attribute value at each point is determined through the above-described priority setting process. In the execution instruction, for example, the above-described determination target point and determination target period are designated.

Here, it is assumed that the priority of the attribute value at each point as illustrated in FIG. 7 is stored in the priority storage unit 36. It is assumed that the road deterioration determination model is stored in the model storage unit 33 in advance.

The selection unit 37 acquires the priority of the attribute value of the determination target point from the priority storage unit 36 (step S201). For example, the selection unit 37 acquires the priority of the attribute value as illustrated in FIG. 7 at the point A1_1.

The selection unit 37 acquires the image information in which the imaging point is the determination target point and the imaging time is within the determination target period from the image storage unit 32 (step S202).

The selection unit 37 selects the image information from the image information acquired in step S202 based on the priority of the attribute value acquired in step S201 (step S203). Here, the selection unit 37 selects, for example, the image information in which the priority has the highest priority or an attribute value equal to or more than a predetermined value. For example, the selection unit 37 acquires, at the point A1_1, the image information in which the priority is 1 and "an attribute: weather, an attribute value: cloudy" based on the priority in FIG. 7.

The determination unit 38 inputs an image included in the image information acquired in step S203 to the road deterioration determination model and acquires a determination result of the deterioration of the road (step S204).

The determination unit 38 outputs (displays) the determination result to a display device or the like (not illustrated) (step S205). For example, the determination unit 38 outputs the determination result in a format similar to that in FIG. 4.

Then, the operation according to the first example embodiment is completed.

According to each example embodiment, the deterioration of the road may be calculated using information other than the image information in addition to the image information. For example, according to each example embodiment, the deterioration of the road may be calculated by using acceleration detected using an acceleration sensor or the like. According to each example embodiment, a rutting amount may be used as an index of the deterioration of the road. In this case, a value of the index of the deterioration of the road is generally an integer of 0 or more (in units of mm). A rational number may be used as the value of the rutting amount. Alternatively, according to each example embodiment, an international roughness index (IRI) may be used as an index of the deterioration of the road. In this case, the value of the degree of deterioration is a rational number of 0 or more (in units of mm/m). Alternatively, according to each example embodiment, a maintenance control index (MCI) may be used as an index of the deterioration of the road. The MCI is a composite deterioration index obtained from a cracking ratio, a rutting amount, and flatness.

Next, advantageous effects of the first example embodiment will be described.

According to the first example embodiment, in the road deterioration determination, it is possible to improve determination accuracy at various points. The reason is as follows. That is, the selection unit 37 of the road deterioration determination device 30 selects an image of a road surface captured at one point on a road based on the priority of values of attributes set at the points on the road and related to the capturing of the images of the road surface captured at the points. This is because the determination unit 38 determines the deterioration of the road at the one point using the selected image and a model for determining the deterioration of the road from the image.

According to the first example embodiment, in the road deterioration determination, it is possible to determine the priority of the value of the attribute related to the capturing of the image of the road surface in such a way that the determination accuracy at various points can be improved. The reason is as follows. That is, this is because the priority determining unit 35 of the road deterioration determination device 30 determines, for each point on the road, the priority of the value of the attribute at the point based on the determination result of the deterioration of the road obtained using the image of the road surface captured at the point and the model and the state of the deterioration of the road at the point.

Second Example Embodiment

A second example embodiment will be described.

The second example embodiment is different from the first example embodiment in that image information is selected based on a total value of scores given to attribute values of attributes using priority instead of priority of an attribute value.

In the second example embodiment, description of a portion that has a function similar to that of the first example embodiment will be omitted, and only a configuration that has a different function will be described.

(Configuration of Road Deterioration Determination Device)

Figure 10:
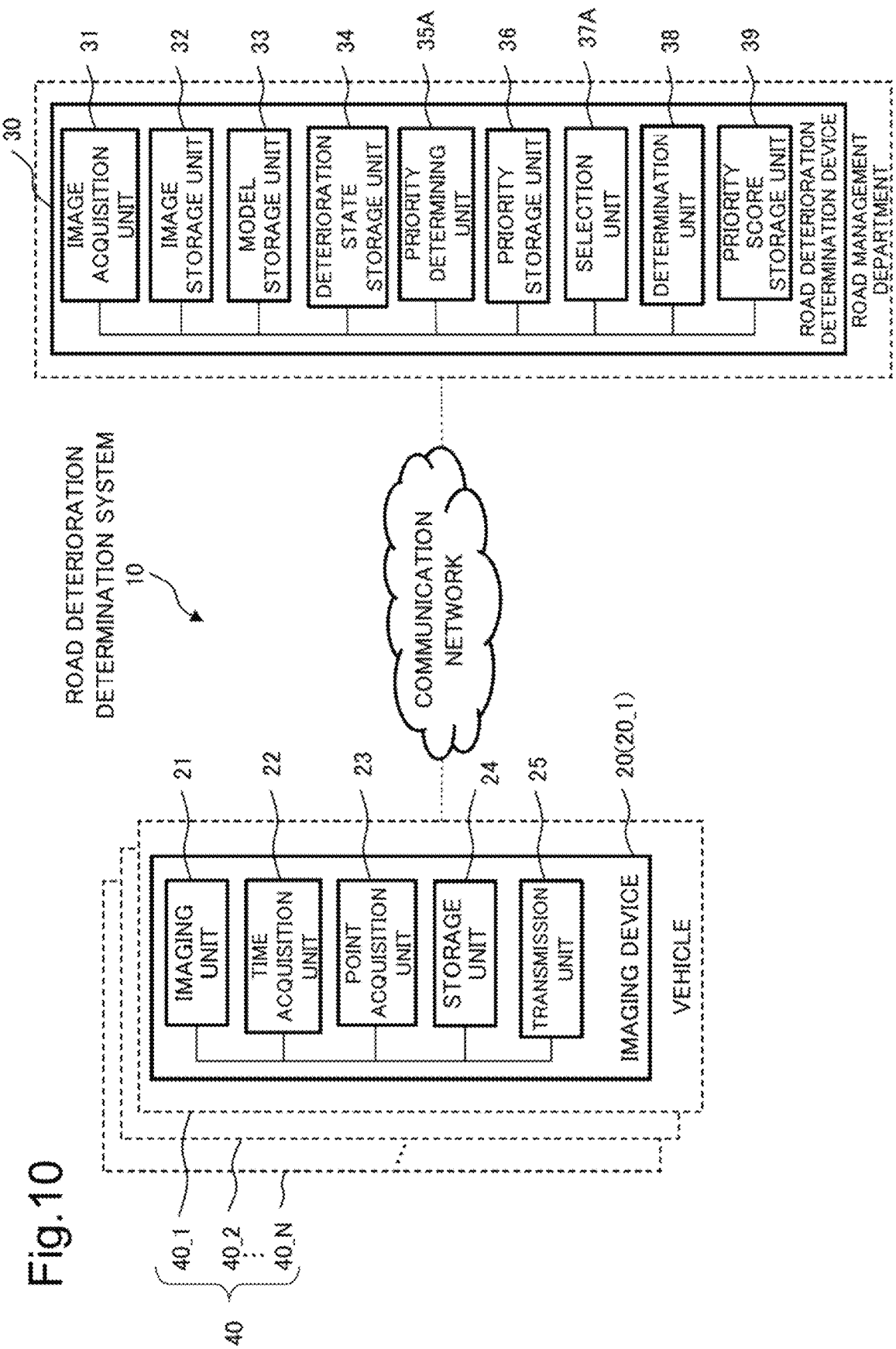
FIG. 10 is a block diagram illustrating a configuration of the road deterioration determination system 10 according to a second example embodiment.

FIG. 10 is a block diagram illustrating an example of a configuration of the road deterioration determination system 10 according to the second example embodiment.

The road deterioration determination device 30 according to the second example embodiment further includes a priority score storage unit 39 in addition to the configuration of the road deterioration determination device 30 according to the first example embodiment. The priority determining unit 35 and the selection unit 37 of the road deterioration determination device 30 according to the first example embodiment are replaced with a priority determining unit 35A and a selection unit 37A, respectively.

The priority determining unit 35A generates a score table for attributes added to an image at each point on a road. The score table indicates a priority score of the attribute value of each attribute. Like the priority of the first example embodiment, the priority score is used to select an image (select an image having a large total value of the priority scores) when the road deterioration determination using the road deterioration determination model is executed.

Like the priority determining unit 35 according to the first example embodiment, the priority determining unit 35A compares each of the determination results of the deterioration of the road obtained by inputting each of the images included in the image information in the priority calculation target period to the road deterioration determination model with the road deterioration state (the answer data) acquired from the deterioration state storage unit 34. The priority determining unit 35A determines the priority of the attribute value for each attribute based on the comparison result. For example, the priority determining unit 35 calculates a matching ratio between a determination result by the road deterioration determination model and the road deterioration state (answer data) for each image. Then, the priority determining unit 35A determines the priority for each attribute in the same scheme as that of the first example embodiment in such a way that the priority of the attribute value is higher as the matching ratio is higher.

FIG. 11 is a diagram illustrating an example of priority of an attribute value for each attribute according to the second example embodiment. In the example of FIG. 11, for example, for the attribute "weather", priorities "1", "2", and "3" are set in attribute values "cloudy", "sunny", and "rainy", respectively.

Further, the priority determining unit 35A generates, for each attribute, a score table by determining a priority score in such a way that the priority score is higher as the priority is higher.

FIG. 12 is a diagram illustrating an example of a score table according to the second example embodiment. In the example of FIG. 12, scores "30", "20", and "0" are set in priorities "1", "2", and "3", respectively.

The priority score storage unit 39 stores the score table of each point generated by the priority determining unit 35A.

The selection unit 37A acquires the score table of the determination target point from the priority score storage unit 39. Then, from the image information stored in the image storage unit 32, the selection unit 37A selects the image information in which the imaging point is the determination target point, which is within the determination target period, and in which a total score of the attribute values is high (the total score is the highest or the total score is equal to or more than a predetermined value). The total score is obtained by summing the priority scores for the attribute values of the attributes indicated in the score table.

Next, an operation according to the second example embodiment will be described.

(Priority Setting Process)

Figure 13:
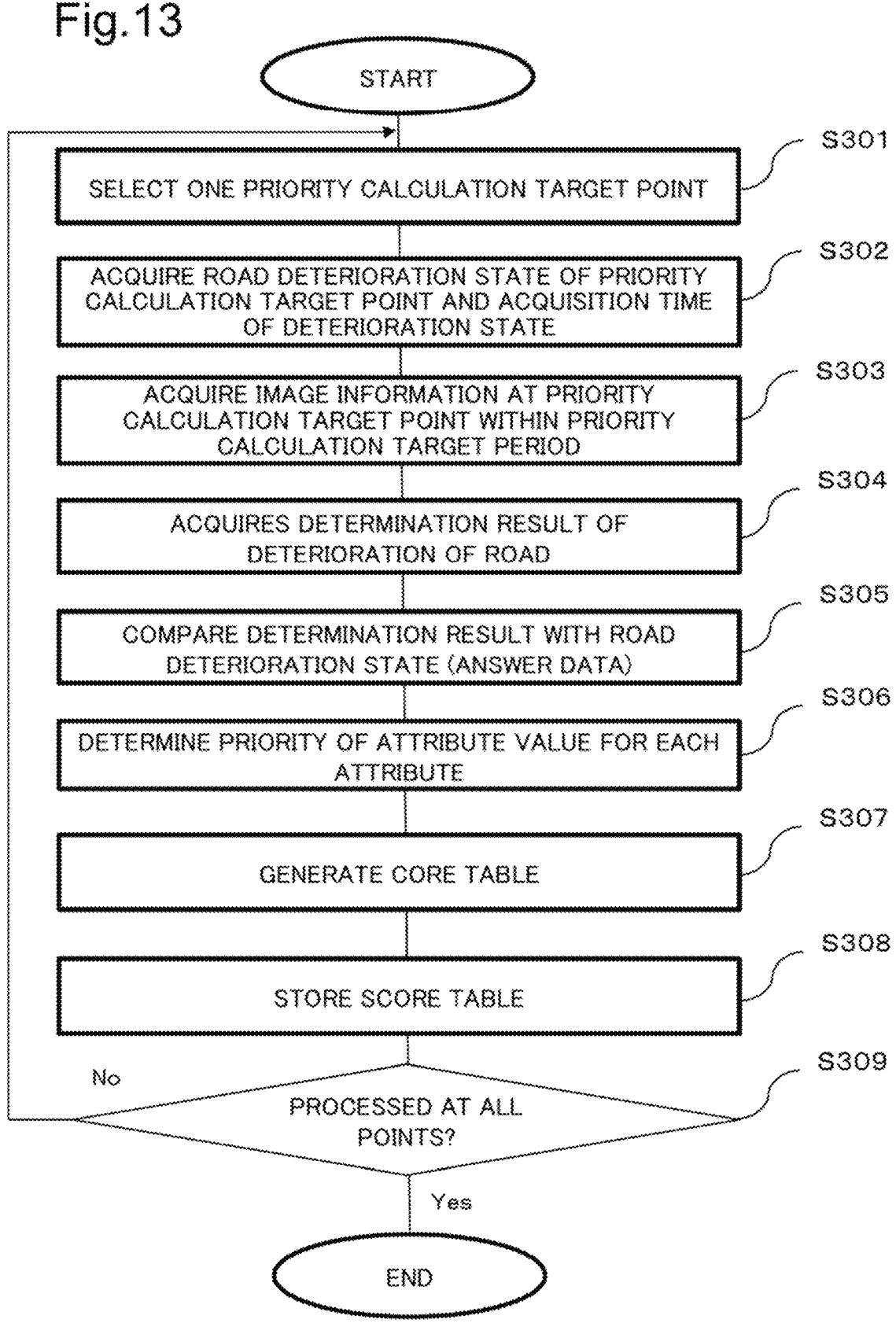
FIG. 13 is a flowchart illustrating a priority setting process according to the second example embodiment.

FIG. 13 is a flowchart illustrating a priority setting process according to the second example embodiment. Processes (steps S301 to S305) until the comparison between the determination result of the deterioration of the road by the road deterioration determination model and the road deterioration state (the answer data) in the priority setting process according to the second example embodiment are the same as steps S101 to S105 in the priority setting process according to the first example embodiment.

The priority determining unit 35A determines the priority of the attribute value for each attribute based on the comparison result (step S306). For example, the priority determining unit 35A determines the priority of the attribute value for each attribute, as illustrated in FIG. 11, based on the matching ratio and the attribute value calculated for each image at the point A1_1.

The priority determining unit 35A generates a score table by determining the priority score for each attribute (step S307). For example, the priority determining unit 35A generates a score table for the point A1_1 as illustrated in FIG. 12.

The priority determining unit 35A stores the determined score table in the priority score storage unit 39 (step S308).

The priority determining unit 35A repeats the process from step S301 at all the points on the road (step S309).

(Image Information Selection Process)

Figure 14:
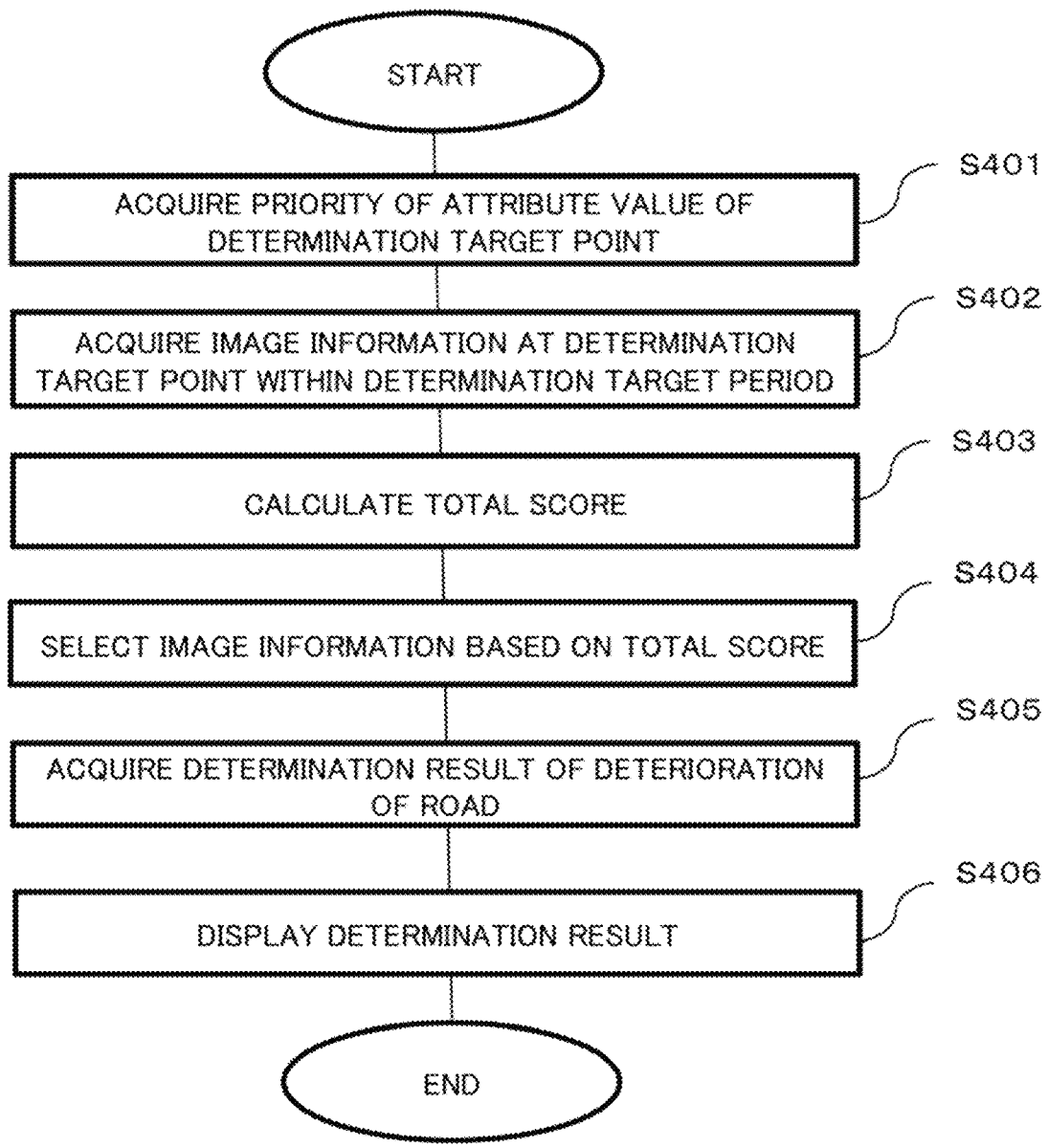
FIG. 14 is a flowchart illustrating a road deterioration determination process according to the second example embodiment.

FIG. 14 is a flowchart illustrating a road deterioration determination process according to the second example embodiment.

The selection unit 37A acquires the priority of the attribute value of the determination target point from the priority score storage unit 39 (step S401). For example, the selection unit 37A acquires the score table as illustrated in FIG. 12 at the point A1_1.

The selection unit 37A acquires, from the image storage unit 32, the image information in which the imaging point is the determination target point and the imaging time is within the determination target period (step S402).

The selection unit 37A calculates a total score of each piece of image information acquired in step S402 based on the score table acquired in step S401 (step S403).

FIG. 15 is a diagram illustrating an example of the total score calculated for the image information according to the second example embodiment. For example, the selection unit 37A calculates a total score of the three pieces of image information, as illustrated in FIG. 15.

The selection unit 37A selects the image information from the image information acquired in step S402 based on the total score calculated in step S403 (step S404). Here, the selection unit 37A selects, for example, the image information in which the total score is the highest or the total score is equal to or more than a predetermined value. For example, the selection unit 37A acquires, at the point A1_1, the image information that has "attribute: vehicle type, attribute value: SUV", "attribute: weather, attribute value: cloudy", and "attribute: time zone, attribute value: 12:00 to 14:00" having a total score of 80 based on the total score in FIG. 15.

The determination unit 38 inputs an image included in the image information acquired in step S404 to the road deterioration determination model and acquires a determination result of the deterioration of the road (step S405).

The determination unit 38 outputs (displays) the determination result to a display device or the like (not illustrated) (step S406).

In this way, the operation according to the second example embodiment is completed.

Next, advantageous effects of the second example embodiment will be described.

According to the second example embodiment, as in the first example embodiment, it is possible to improve determination accuracy at various points in road deterioration determination. The reason is as follows. That is, the selection unit 37A of the road deterioration determination device 30 selects an image of a road surface captured at one point on the road based on the total value of the priority score of the values of the attributes set at each point on the road. This is because the determination unit 38 determines the deterioration of the road at the one point using the selected image and a model for determining the deterioration of the road from the image.

Third Example Embodiment

A third example embodiment will be described.

Figure 16:
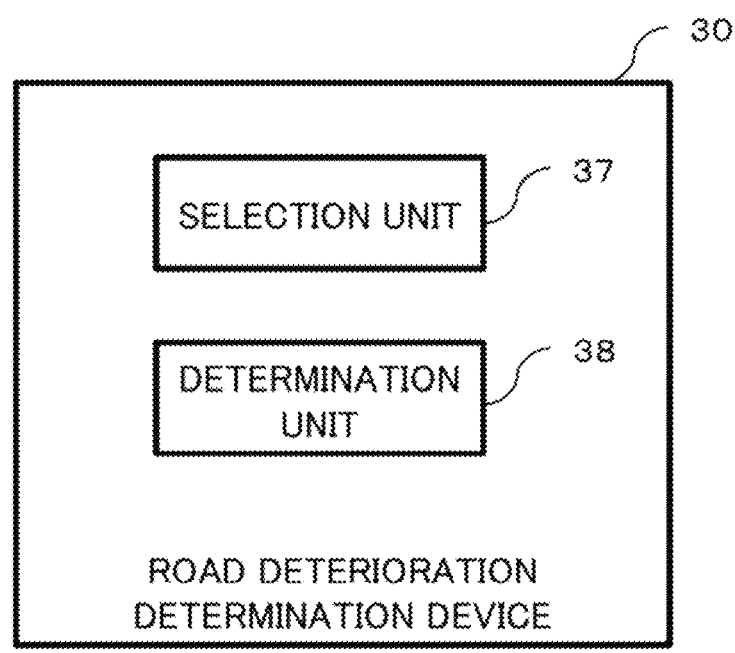
FIG. 16 is a block diagram illustrating an exemplary configuration of the road deterioration determination device 30 according to a third example embodiment.

FIG. 16 is a block diagram illustrating an example of a configuration of the road deterioration determination device 30 according to the third example embodiment. Referring to FIG. 16, the road deterioration determination device 30 according to the third example embodiment includes the selection unit 37 and the determination unit 38. The selection unit 37 and the determination unit 38 are an example embodiment of a selection means and a determination means of the present disclosure, respectively.

The selection unit 37 selects an image of a road surface captured at one point on a road based on priority of a value of attribute set at the point on the road and related to capturing of an image of the road surface captured at the point.

The determination unit 38 determines deterioration of the road at one point using the selected image and the model for determining deterioration of the road from the image.

According to the third example embodiment, it is possible to improve determination accuracy at various points in the road deterioration determination. The reason is as follows. That is, the selection unit 37 of the road deterioration determination device 30 selects an image of a road surface captured at one point on a road based on the priority of values of attributes set at the points on the road and related to the capturing of the images of the road surface captured at the points. This is because the determination unit 38 determines the deterioration of the road at the one point using the selected image and a model for determining the deterioration of the road from the image.

(Hardware Configuration)

In each of the above-described example embodiments, each component of each device (the imaging device 20, the road deterioration determination device 30, and the like) indicates a block of a functional unit. Some or all of the components of each device may be implemented in any combination of a computer 500 and a program.

Figure 17:
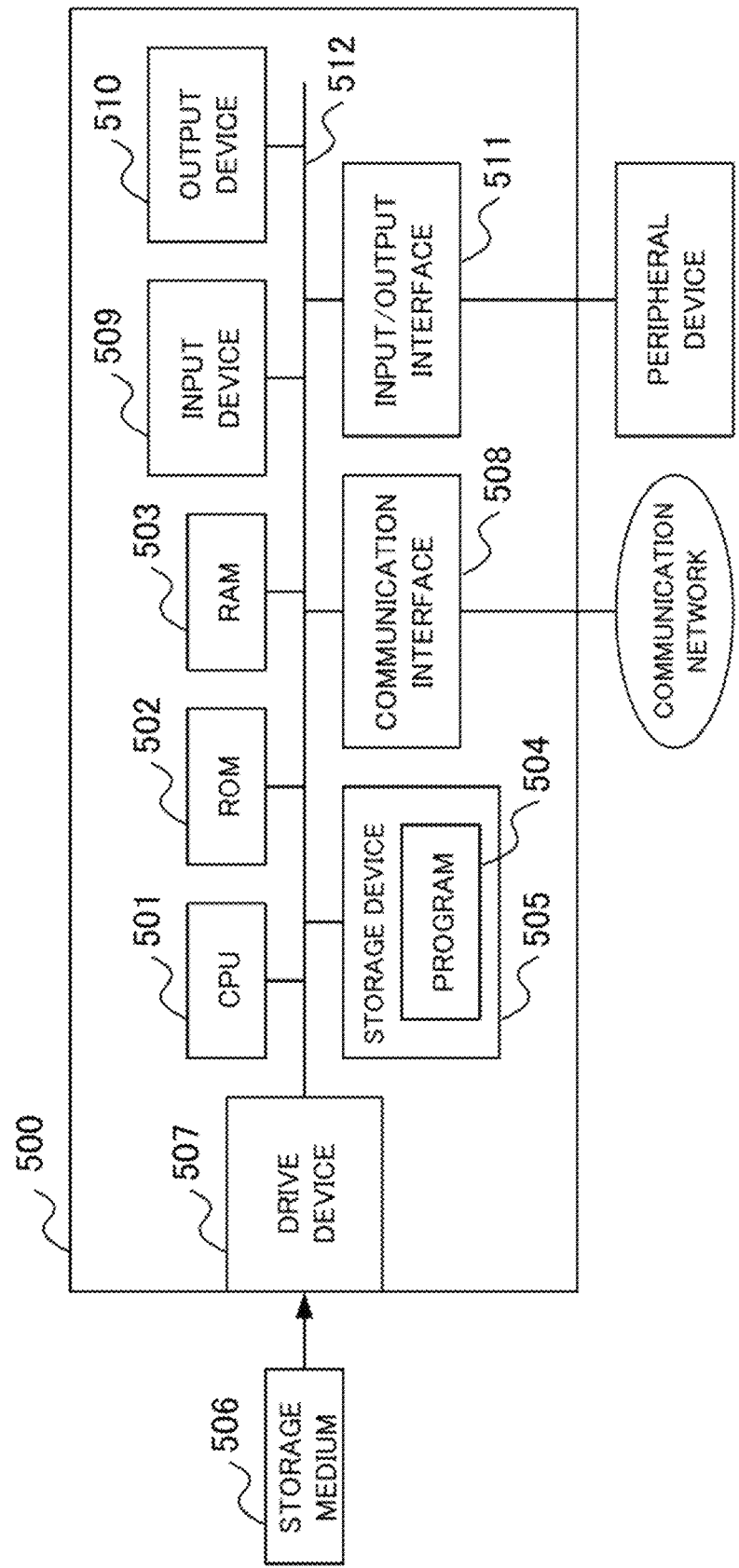
FIG. 17 is a block diagram illustrating an exemplary hardware configuration of a computer 500.

FIG. 17 is a block diagram illustrating an example of a hardware configuration of the computer 500. Referring to FIG. 17, the computer 500 includes, for example, a central processing unit (CPU) 501, a read-only memory (ROM) 502, a random access memory (RAM) 503, a program 504, a storage device 505, a drive device 507, a communication interface 508, an input device 509, an output device 510, an input/output interface 511, and a bus 512.

The program 504 includes instructions for implementing each function of each device. The program 504 is stored in advance in the ROM 502, the RAM 503, or the storage device 505. The CPU 501 implements each function of each device by executing the instructions included in the program 504. For example, the CPU 501 of the road deterioration determination device 30 executes instructions included in the program 504 to implement functions of the image acquisition unit 31, the priority determining unit 35, the selection unit 37, the determination unit 38, and the like. For example, the RAM 503 of the road deterioration determination device 30 may store data of the image storage unit 32, the model storage unit 33, the deterioration state storage unit 34, and the priority storage unit 36.

The drive device 507 executes reading and writing from and on a storage medium 506. The communication interface 508 provides an interface with a communication network. The input device 509 is, for example, a mouse, a keyboard, or the like, and receives an input of information from an operator or the like. The output device 510 is, for example, a display, and outputs (displays) information to an operator or the like. The input/output interface 511 provides an interface with a peripheral device. The bus 512 connects the components of the hardware. The program 504 may be supplied to the CPU 501 via a communication network or may be stored in the storage medium 506 in advance, read by the drive device 507, and supplied to the CPU 501.

The hardware configuration illustrated in FIG. 17 is exemplary, and other components may be added or some of the components may not be included.

There are various modifications of a method of implementing each device. For example, each device may be implemented in any combination of a different computer and a different program different for each component. A plurality of components included in each device may be implemented in any combination of one computer and a program.

Some or all of the components of each device may be implemented by a general-purpose or dedicated circuit (circuitry) including a processor or the like, or a combination thereof. These circuits may be configured by a single chip or may be configured by a plurality of chips connected via a bus. Some or all of the components of each device may be implemented by a combination of the above-described circuit or the like and a program.

In addition, when some or all of the components of each device are implemented by a plurality of computers, circuits, and the like, the plurality of computers, circuits, and the like may be arranged in a centralized manner or in a distributed manner.

The road deterioration determination device 30 may be disposed in the vehicle 40 or may be disposed in a place different from the vehicle 40 and may be connected to the imaging device 20 via a communication network.

Although the example embodiments of the present disclosure have been described above, the present disclosure is not limited to the example embodiments. Various modifications that can be understood by those skilled in the art can be made within the scope of the present disclosure. The configurations in the example embodiments can be combined with each other without departing from the scope of the present disclosure.

This application claims priority based on Japanese Patent Application No. 2020-062853 filed on Mar. 31, 2020, the entire disclosure of which is incorporated herein.

REFERENCE SIGNS LIST 10 road deterioration determination system
20 imaging device
21 imaging unit
22 time acquisition unit
23 point acquisition unit
24 storage unit
25 transmission unit
30 road deterioration determination device
31 image acquisition unit
32 image storage unit
33 model storage unit
34 deterioration state storage unit 35, 35A priority determining unit
36 priority storage unit
37, 37A selection unit
38 determination unit
39 priority score storage unit
40 vehicle
500 computer
501 CPU
502 ROM
503 RAM
504 program
505 storage device
506 storage medium
507 drive device
508 communication interface
509 input device
510 output device
511 input/output interface
512 bus

What is claimed is:

1. A road deterioration determination device comprising:
a memory storing instructions; and
one or more processors configured to execute the instructions to perform processing comprising:
acquiring an image of a road;
inputting the image of the road into a model that outputs, as a determination result of deterioration of the road, a marked-up image in which a partial region of the region has been determined by the model to have the deterioration;
obtaining an actual road deterioration state from an inspector comparing the image of the road or comparing an actual road surface state to the marked-up image in which the partial image of the region has been determined by the model to have the deterioration;
correcting the determination result based on the actual road deterioration state obtained from the comparison;
updating the model based on the determination result as has been corrected;
acquiring an image of a different road; and
determining deterioration of the different road by inputting the image of the different road into the updated model.

2. The road deterioration determination device according to claim 1, wherein the processing further comprises:
determining, for each point on the different road, a priority of a value of an attribute at the each point based on a road deterioration determination result obtained by inputting the image of the different road into the updated model.

3. The road deterioration determination device according to claim 2, wherein the processing further comprises:
selecting an image of the different road at one point on the different road based on a total value of the priority for the value of the attribute at each point.

4. The road deterioration determination device according to claim 3, wherein the processing further comprises:
determining, for each point on the different road, the priority of a value for each of a plurality of attributes at the each point based on the road deterioration determination result obtained by inputting the image of the different road input the updated model.

5. The road deterioration determination device according to claim 2, wherein the processing further comprises:
calculating a matching ratio between the road deterioration determination result obtained by using inputting the image of the different road into the updated model and an actual state of the deterioration of the different road; and
determining the priority in such a way that the priority is higher as the matching ratio is higher.

6. The road deterioration determination device according to claim 2, wherein the processing further comprises:
calculating a matching ratio between the road deterioration determination result obtained by inputting the image of the different road into the updated model and an actual state of the deterioration of the different road; and
determining the priority for the attribute correlated with the matching ratio.

7. The road deterioration determination device according to claim 2, wherein
the attribute includes at least one of a type of a vehicle in the image of the different road is captured, weather at a time at which the image of the different road is captured, and a time zone including the time at which the image of the different road is captured.

8. A road deterioration determination method performed by a computer and comprising:
acquiring an image of a road;
inputting the image of the road into a model that outputs, as a determination result of deterioration of the road, a marked-up image in which a partial region of the region has been determined by the model to have the deterioration;
obtaining an actual road deterioration state from an inspector comparing the image of the road or comparing an actual road surface state to the marked-up image in which the partial image of the region has been determined by the model to have the deterioration;
correcting the determination result based on the actual road deterioration state obtained from the comparison;
updating the model based on the determination result as has been corrected;
acquiring an image of a different road; and
determining deterioration of the different road by inputting the image of the different road into the updated model.

9. A non-transitory computer-readable storage medium storing a program executable by a computer to perform processing comprising:
acquiring an image of a road;
inputting the image of the road into a model that outputs, as a determination result of deterioration of the road, a marked-up image in which a partial region of the region has been determined by the model to have the deterioration;
obtaining an actual road deterioration state from an inspector comparing the image of the road or comparing an actual road surface state to the marked-up image in which the partial image of the region has been determined by the model to have the deterioration;
correcting the determination result based on the actual road deterioration state obtained from the comparison;
updating the model based on the determination result as has been corrected;
acquiring an image of a different road; and
determining deterioration of the different road by inputting the image of the different road into the updated model.

10. The road deterioration determination device according to claim 2, wherein the attribute includes in-vehicle environment includes at least one of a windshield reflection state of a vehicle in the image of the different road, and weather at a dirty windshield state of the vehicle in the image of the different road.

\* \* \* \* \*